United States Patent [19]

Frase et al.

[11] 4,128,191
[45] Dec. 5, 1978

[54] COLLECTOR FOR A PNEUMATIC DISPENSER

[75] Inventors: Roland J. Frase, Roselle; Harold G. Meitl, Darien; Tom M. McNaull, La Grange, all of Ill.

[73] Assignee: International Harvester Company, Chicago, Ill.

[21] Appl. No.: 843,469

[22] Filed: Oct. 19, 1977

Related U.S. Application Data

[63] Continuation of Ser. No. 681,306, Apr. 29, 1976, Pat. No. 4,091,968.

[51] Int. Cl.² .............................................. G01F 11/24
[52] U.S. Cl. .................... 222/167; 221/277; 222/330
[58] Field of Search ............... 222/167, 193, 330, 410; 221/96, 211, 277; 111/6–7.4, 80

[56] References Cited

U.S. PATENT DOCUMENTS

| | | | |
|---|---|---|---|
| 1,527,128 | 2/1975 | Durouaux et al. | 222/167 |
| 3,093,268 | 6/1963 | Smith et al. | 222/167 |
| 3,512,489 | 5/1970 | Coldren et al. | 111/80 X |
| 3,581,949 | 6/1971 | Conrad et al. | 222/167 |
| 3,616,973 | 11/1971 | Hartley | 222/330 |
| 3,637,108 | 1/1972 | Loesch et al. | 222/167 X |
| 3,742,877 | 7/1973 | Coffee | 111/6 |
| 3,804,036 | 4/1974 | Seifert | 222/193 |
| 3,860,146 | 1/1975 | Bauman et al. | 221/111 |
| 3,904,335 | 9/1975 | Watkins | 222/330 X |

*Primary Examiner*—Allen N. Knowles
*Assistant Examiner*—Fred A. Silverberg
*Attorney, Agent, or Firm*—Dennis K. Sullivan; Neal C. Johnson; F. David AuBuchon

[57] ABSTRACT

An improved pneumatic material dispenser of the type wherein material is dropped from the periphery of a rotating element into adjacent axially spaced material collecting passages of a collector and an air supply propels the material through discharge tubes attached to the collector to remote locations, the improvement being a plenum chamber which receives the air supply and feeds it to the collecting passages through air passages at a point remote from the material entry thereinto.

12 Claims, 7 Drawing Figures

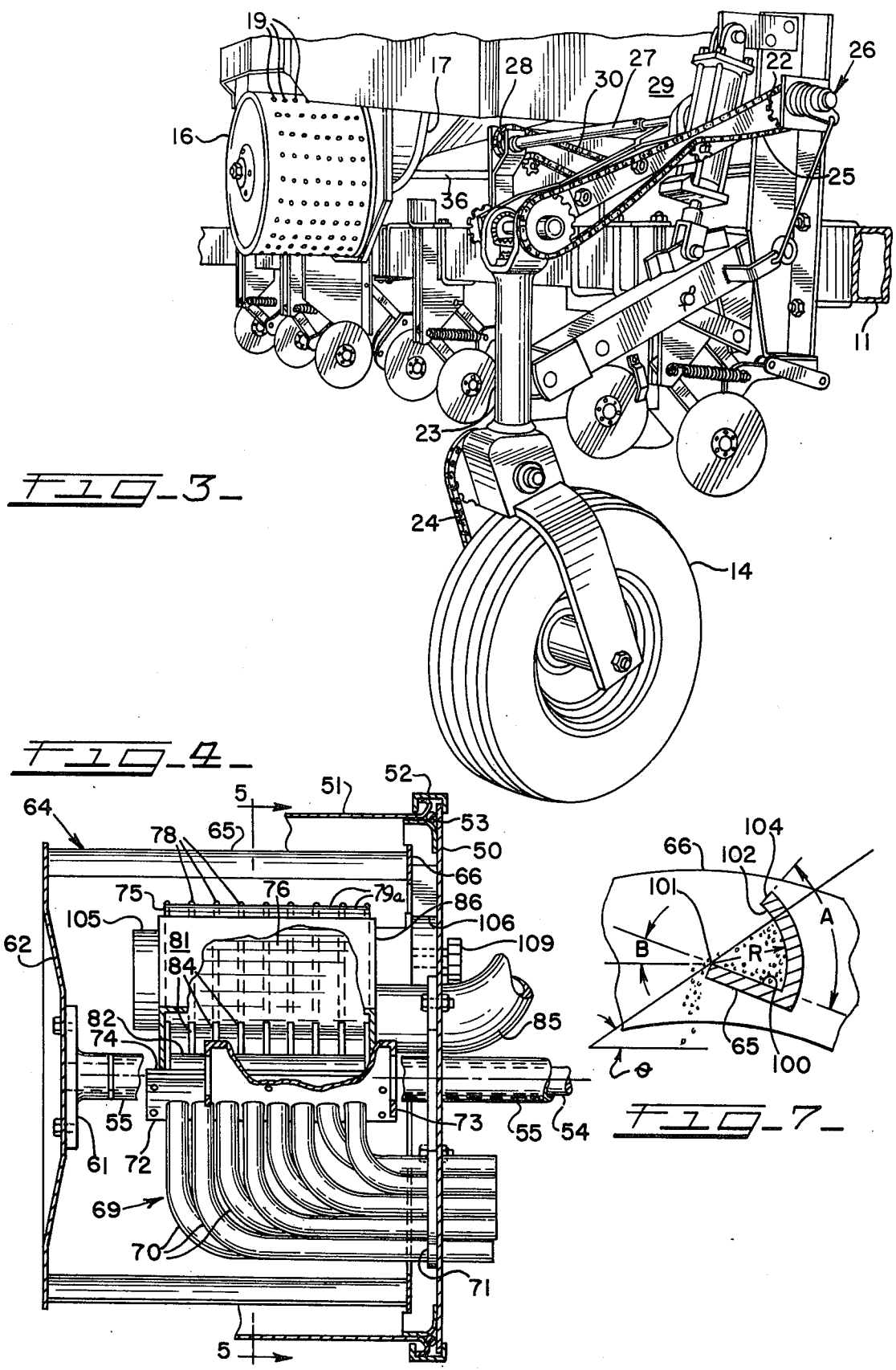

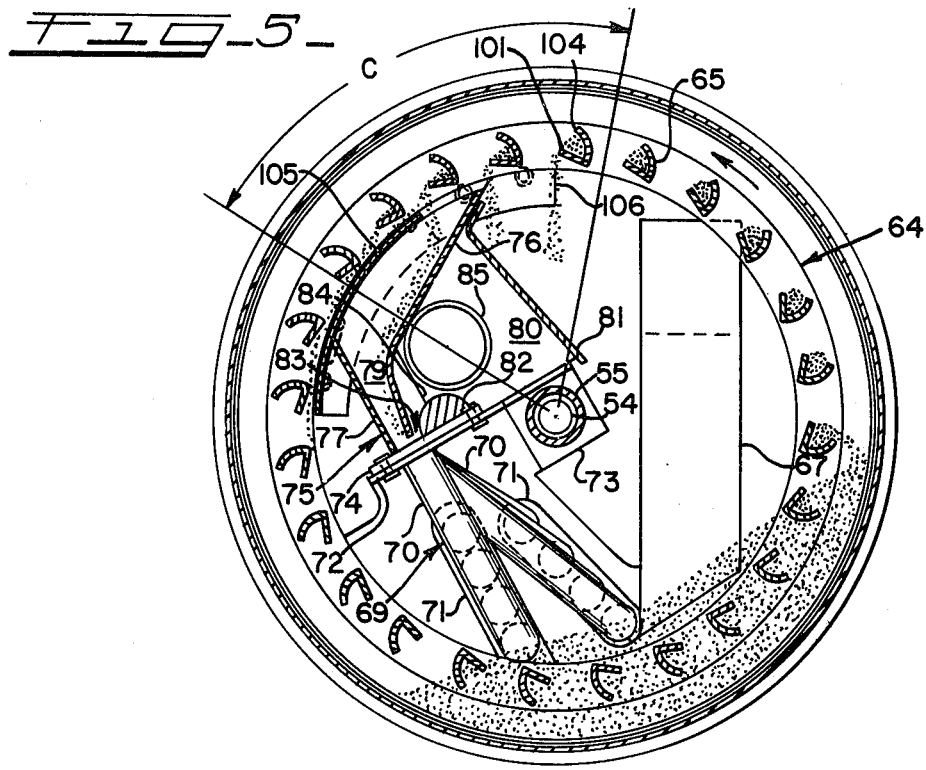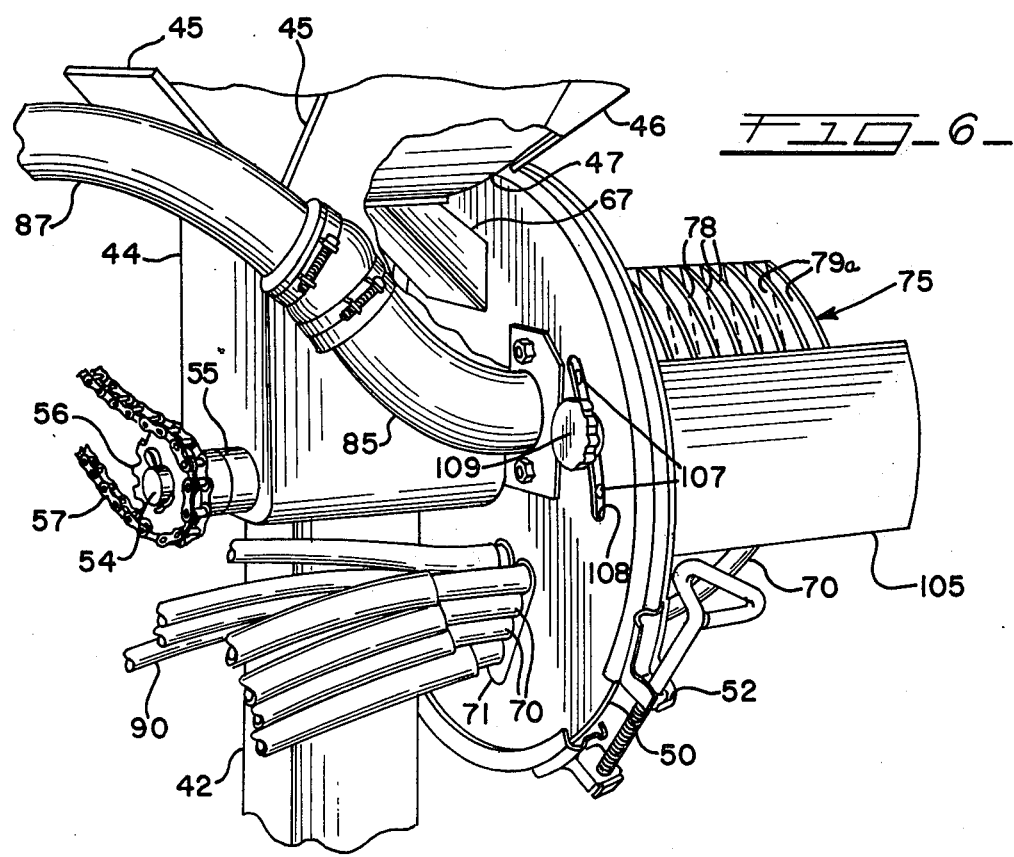

COLLECTOR FOR A PNEUMATIC DISPENSER

This is a continuation, of application Ser. No. 681,306, filed Apr. 29, 1976 now U.S. Pat. No. 4,091,968.

CROSS-REFERENCE TO RELATED APPLICATION

This application is related to application Ser. No. 681,307, filed Apr. 29, 1976, now U.S. Pat. No. 4,091,968, by Tom M. McNaull and assigned to the assignee hereof.

BACKGROUND OF THE INVENTION AND THE PRIOR ART

This application relates to pneumatic material dispensers for granular chemicals, grain, seed, and the like of the type wherein material is dropped from the periphery of a rotating element into adjacent, axially spaced, material collecting passages of a collector and an air supply propels the material through discharge tubes attached to the collector for delivery to remote locations and, more particularly, to an improved air supply means and collector therefor.

In the referenced copending application, Ser. No. 681,307, there is taught a fluent material dispenser of the type described above, especially for use with a multiple row planter, which is provided with a precision metering device having a novel bucket. A major aim of that invention is to provide a uniform distribution of the material to each planter row from a central source. However, if the material and air are introduced to the collector at the same point, as in the prior art pneumatic material dispensers of Loesch et al., U.S. Pat. No. 3,637,108, Bauman et al., U.S. Pat. No. 3,860,146, and Schlegel, U.S. Pat. No. 3,731,842, and uneven distribution of material, particularly granular materials and grains, from the various discharge tubes can result. It is believed that this is due to the volume of air flowing through the tubes varying from tube to tube due to varying lengths thereof and causing a greater volume of material to enter passages having a greater air flow.

In the Smith et al. U.S. Pat. No. 3,093,296, in one embodiment, the material drops into the collector adjacent the air flow inlet, and in the other embodiment, the air flows across the bottom of the collector to pick up the material dropped thereinto. However, in either case, the collector of Smith et al. is not divided into discrete collection passages and all the material entering the collector exits the distributor through a single discharge tube. Thus, Smith et al. would not have a uniformity problem with distribution from discrete collection passages nor would it appear that his device would be operable were his collector divided into discrete passages, such as in the present invention.

Accordingly, it is the primary object of the invention described and claimed herein to provide an improved pneumatic dispenser of the type described wherein the material and propelling air are introduced to the collection passages at separate points.

A more specific object of the invention is to provide a plenum chamber adjacent the collector for receiving pressurized air and communicating therewith to introduce the air flow to the collection passages remote from the material collection openings of said passages.

A further specific object of the invention is to provide discrete air passages from the plenum chamber to each of the collection passages.

These and other objects of the invention are specifically met in a pneumatic material dispenser having a rotary member for carrying material on its periphery, a collector within the periphery having a plurality of axially spaced discrete material collection passages having openings near the periphery of the rotary member for gravitationally receiving material dropped from said rotary member, a plurality of discharge tubes in exclusive fluid communication respectively with each of the collection passages and having distal ends, and air supply means for delivering air to the collection passage ends of the discharge tubes at a higher pressure than the distal ends thereof to propel the material therethrough, the air supply means comprising a plenum chamber adjacent the collector supplied from an air source and air passage means establishing communication between the plenum and the collection passages remote from the material collection openings. Preferably, discrete air passages are exclusively downwardly directed respectively into one collection passage and have a reduction in cross-section from the plenum chamber to the collection passages.

DETAILED DESCRIPTION OF THE DRAWINGS

Other objects and advantages of the invention will become apparent upon consideration of the detailed description and the drawings in which:

FIG. 3 is a front left perspective view of the planter of FIG. 1 illustrating the planter ground drive;

FIG. 4 is an axial sectional view of the fluent material dispenser of FIG. 1;

FIG. 5 is a diametral sectional view of the material dispenser taken along the line 5—5 of FIG. 4;

FIG. 6 is an enlarged perspective view of the mounting of the dispenser of FIG. 1 on the planter frame; and FIG. 7 is an enlarged radial cross-sectional view of one of the buckets illustrated in FIG. 5.

DETAILED DESCRIPTION OF THE PREFERRED EMBODIMENT

Figure 1:
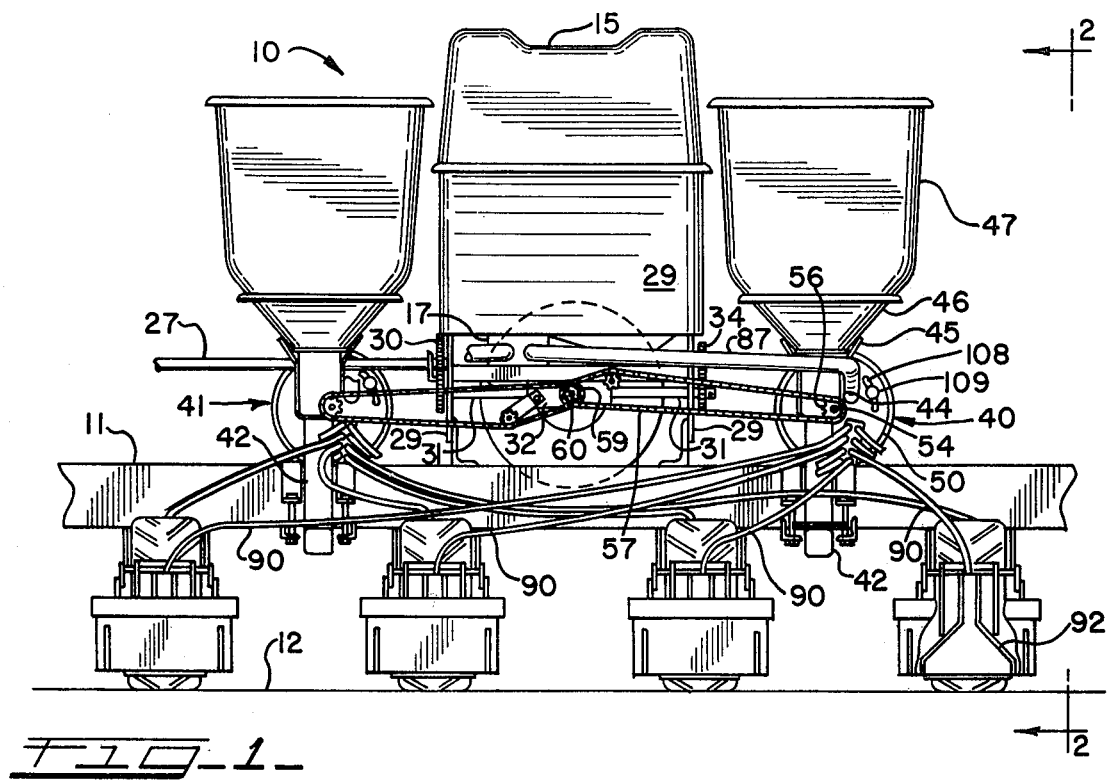
FIG. 1 is a rear view of a portion of a multiple row planter having two fluent material dispensers for granular chemicals incorporating Applicant's invention.
Figure 2:
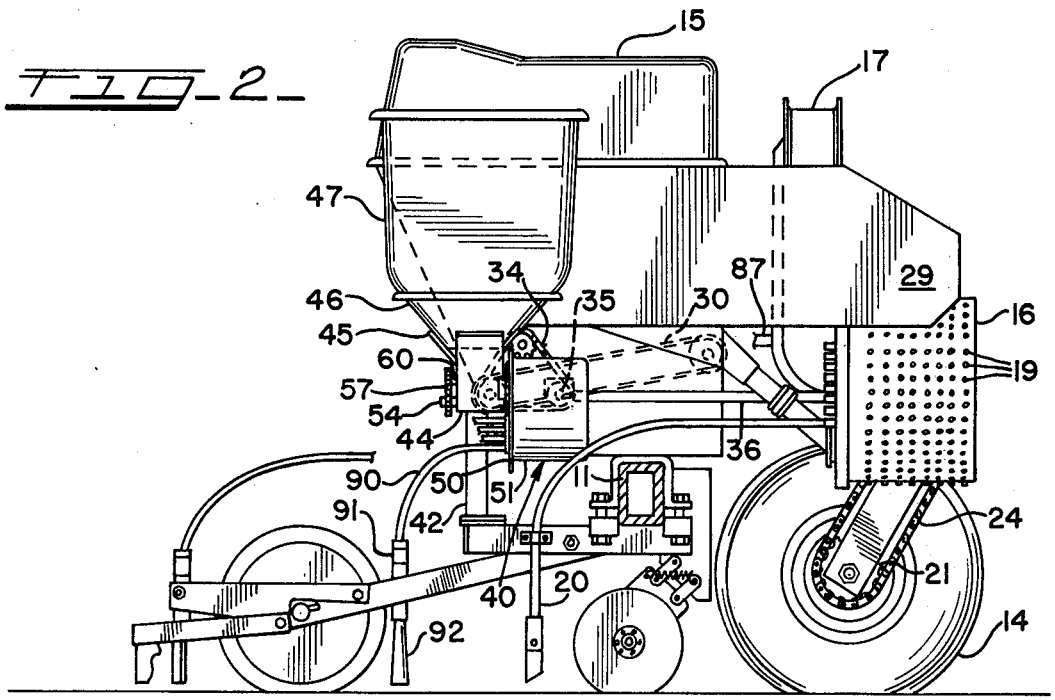
FIG. 2 is a side view partly in section of the planter of FIG. 1.

Turning now to FIGS. 1, 2 and 3, there is shown the middle four rows of an eight row planter generally designated 10 mounted on a transverse tool bar 11 generally parallel with the ground 12 for forward travel on ground wheels, one of which is shown at 14, behind an associated tractor (not shown). The planter 10 is a pneumatic planter of the type illustrated in Bauman et al. U.S. Pat. No. 3,860,146, which is hereby incorporated by reference, and includes a central seed hopper 15 which feeds seed into a perforated rotatable drum 16 pressurized by an air supply means or fan in a housing 17 driven from the PTO of the pulling tractor (not shown). The planting means in this case comprises the rotating drum 16 in which a seed is carried on the inner side of each of the drum perforations 19 to the top side of the drum whereat the perforations are closed and the seed falls into an axially divided distributing manifold or collector (not shown) and is transported by air through discharge tubes, one of which is shown at 20 in FIG. 2 to the individual plant rows. The ground-synchronized drive for the seed drum 16 comprises the ground wheel 14 having an axle sprocket 21 (FIG. 2) which drives a sprocket 22 mounted on the tool bar 11 (FIG. 3) through a suitable drive mechanism including chains 24 and 25, a bevel gear drive in the wheel support 23 completing the driving connection between the chains 24 and 25. A clutch mechanism 26, which breaks the driving connection when the tool bar 11 is raised relative to the ground wheel 14, connects the sprocket 22 with a transverse drive shaft 27 extending from the sprocket 22 to a sprocket 28 adjacent the planter housing 29. Chain 30 extends from the sprocket 28 to drive a rear cross shaft 31 (FIGS. 1 and 2) which extends transversely through a right angle gear box 32 to a three sprocket chain drive 34 on the opposite side of the housing 29 driving a forward drive shaft 35 which drives the drum drive shaft 36 through a second right angle gear box. It will be appreciated that, with the exception of the right angle gear box 32, the foregoing planter and drive is known in the art.

A pair of fluent material dispensers generally designated 40 and 41, for herbicide and insecticide respectively, are mounted on stanchions 42 attached to the tool bar 11 on either side of the planter housing 29. Since the dispensers 40 and 41 are identical, only the dispenser 40 will be described. A hollow base member 44 is welded at the top of the stanchion 42, the base member having an open front side and transverse and rearward sides which flare out as at 45 to receive a hopper base 46 in which an upright covered hoppper 47 is mounted. Adjacent the forward side of the base member 44, a circular distributor housing base plate 50 is fixedly mounted in a vertical plane. A cylindrical distributor housing 51, having one closed end, has a flanged open end of the same diameter as the base plate 50 and is clamped thereagainst, with an "O" ring 53 inbetween, by ring clamp 52 to form a sealed nonrotatable housing. A horizontal rotor shaft 54 is rotatably mounted as by bearings in a fore-and-aft extending sleeve 55 mounted on the base member 44. The rearward end of the rotor shaft 54 is provided with a driving sprocket 56, a rotor drive chain 57 being entrained thereabout. The rotor drive chain 57 is driven from one of two sprockets 59 mounted on a stub shaft 60 extending rearwardly from the right angle drive 32 of the planter 10, the other sprocket (not shown) driving the dispenser 41.

A flange 61 is mounted on the forward end of the rotor drive shaft 54 near the closed end of the distributor housing 51 and a forward diametral plate 62 of a metering rotor 64 is bolted thereto. A plurality of buckets 65, mounted in equal spacing adjacent the circumference of the plate 62, extend rearwardly, parallel to the rotor axis, to an annular plate 66 which interconnects the rearward ends of the buckets 65. The plates 62 and 66 and the axially elongated buckets 65 thus form the rotor 64 which rotates in the direction of the arrow shown on FIG. 5. The radial cross-section of the buckets 65 will be described hereinafter.

The distributor housing base plate 50 is further provided with a filling tube 67 mounted therethrough and extending diagonally from the base of the hopper 47 to the lower interior portion of the distributor housing 51 terminating a distance short of the inner periphery of the rotor buckets 65 sufficient to maintain a high enough material level within the housing to ensure that the rotor buckets 65 will become completely filled as they are moved through the material when the rotor is turned. Due to the crystalline nature of granular materials, the end of the tube 67 will also prevent the material level from building up to excessive levels requiring additional power to move the rotor bucket 65 therethrough.

Bolted to the base plate 50 is a manifold assembly 69 which comprises a number of discharge tubes 70, in this embodiment eight tubes, which extend through the base plate 50 in two four tube arrays, a sealing plate 71 being fastened to each four tube array to seal the respective openings in the base plate 50 therefor. The inner ends of the tubes 70 are axially disposed along and fastened to a mounting plate 72 disposed axially within the periphery of the rotor 64, the plate 72 having downturned tabs 73 which rotatably fit about the rotor shaft sleeve 55. The manifold assembly 69 thus has a fixed position within the rotor periphery.

Mounted on the axial manifold plate 72 by a base plate 74 and extending generally upwardly is a collector 75 which has an open arcuate material collecting area disposed near the inner periphery of the rotor buckets 65 for collecting material dumped therefrom over a substantial interval of arcuate travel of the rotor buckets, the collection area commencing at a rotationally forward collector wall 76 and terminating at a rotationally rearward wall 77 except, as will hereinafter be seen, the actual collecting interval may be variably limited by the cover 105. The collector 75 is divided axially by interior walls 78 into a plurality of equally spaced discrete material collection passages 79 having material collection openings 79a near the bucket periphery, which extend downwardly to communicate exclusively respectively with each of the tubes 70. Thus, in the absence of air flow through the openings 79a, an equal portion of the material falling off the axially elongated rotor buckets 65 will fall into the opening 79a of each of the collection passages 79 and the material collected in that passage will fall only into its respective tube 70.

The forward wall 76 and the rearward wall 77 funnel downwardly toward the tubes 70. However, it will be seen in FIG. 5 that the forward wall 76 extends downwardly inwardly of the opening of the tubes 70 thus funneling the material in the collection passages 79 to the rotationally rearward side of the tube entrances. The rotationally forward side of the tube 70 communicates with a plenum chamber 80 formed by a cover 81 extending from the upper portion of the wall 76 to the axial manifold plate 72 and enclosing both ends of the collector 75. The portion of the collector base plate 74 within the chamber 80 is provided with an axially extending half round member 82 spaced a small distance from the forward collector wall 76 and the lower portion of the interior walls 78 are extended as at 84 into the chamber 80 to form a downwardly directed passage 83 for air in the plenum chamber 80 to enter each tube 70, the convex surface of the half round member reducing the cross-sectional area of the passage 83 from the plenum chamber to the material collection passage 79. This creates a slight venturi effect and lowers the pressure at the collection passage end of the air passage. Pressurized air is introduced into the plenum chamber 80 through a tube 85 extending through the rear cover wall 86 from the base plate 50, the air supply tube 85 being connected by tubing 87 (FIG. 1) extending from the base plate 50 to the housing 17 of the planter fan, a pressure reducing means, such as an orifice, being incorporated in the tubing 87 as necessary. The forward corner of the axial manifold plate 72 near the downturned tab 73 is cut away to allow the air in the plenum chamber 80 to pressurize the housing 51. The pressure in the housing 51 may be slightly lower than that in the plenum chamber 80 due to the above manner of air introduction and preferably is equal to or slightly greater than the pressure at the collection passage end of the air passages to prevent or minimize air flow and, in any case, prevent back flow, through the passages 79.

Attached to the ends of each of the tubes 70 external of the base plate 50 are discharge extension tubes 90 which extend to distal ends at the various planter rows whereat air diffusers 91, open to atmospheric pressure, of the type illustrated in Norris et al. patent application No. 547,314, filed Feb. 5, 1975, now U.S. Pat. No. 3,964,639, may be incorporated if desired in the tubes 90 prior to the material dropping into a triangular distributor 92 for laying the material on the ground in a band. It will be noted from FIGS. 1 and 2 that discharge tubes are provided for each row from each of the dispensers 40 and 41. Since the length of the discharge extension tubes 90 will vary depending on the distance of the row from the dispenser housing, it is preferable that the longer tubes be of a larger diameter to minimize differences in the air flow through the tubes.

Thus, the bulk of the air flow for transporting the material through the discharge tubes enters the collection passages 79 from the plenum chamber 80 through the passages 83 rather than through the material collection openings 79a of the passages 79. Ideally, all of the transporting air would be introduced at this point since the distribution between the openings 79a of the material falling off the buckets 65 would be least affected if it fell into the collection passages 79 only under the influence of gravity and in the absence of any air flow. If the pressure drop caused by the reduction in cross-sectional area of the air passage 83 were equal to the pressure drop between the plenum chamber 80 and distributor housing 51, the pressure at both ends of the collection passages 79 would be equal and no air flow would occur. In practice, however, the housing pressure is slightly higher to minimize the possibility of back flow in the passages which would have a more drastic effect on the distribution between rows. However, the induced air velocity caused thereby should be minimal since the area of the collection passage openings 79a are considerably larger than the lower end of the passages.

Returning now to the metering device and referring primarily to FIGS. 5 and 7, it will be seen that the radial cross-section of the buckets 65 is configured to produce an interval C of substantially uniform dumping therefrom per degree of rotor rotation and, to this end, comprises a radially inner flat or linear wall 100 having a rotationally leading edge 101 and an arcuate radially outer rotationally trailing wall 102 which is disposed at a substantially uniform radius R about the leading edge 101 from the junction of the walls 100 and 102 through an angle A to a rotationally trailing edge 104. The linear wall 100 may angle radially inwardly from the leading edge 101 at an angle B from the tangent of the rotor 64 to retard the end point of the dumping interval. A complete explanation of the bucket configuration and the relationships of the parameters affecting it may be found by reference to the copending application, Ser. No. 681,307.

The collector 75 is disposed relative to the rotor 64 to collect material only during the interval C of uniform dumping from the buckets 65. In order to regulate the amount of material dumped into the material collection openings 79a, a sheet material cover 105 is circumferentially slidably mounted by a base block 106 to the base plate 50. The cover 105 extends outwardly from the base plate 50 to lie adjacent the arcuate periphery of the collector 75 covering the rotationally trailing portion of all the openings 79a thereof. The base block 106 has a plurality of holes 107 aligned with an arcuate slot 108 in the base plate 50 and is retained thereagainst by a knob 109 having a threaded shaft which engages one of the holes 107 to draw the knob 109 against the exterior side of the base plate. Grossly, by selecting a hole 107, and finely, by sliding the cover 105 circumferentially, the collection openings 79a and thus the interval of collection of material dumped from the buckets 65 may selectively be varied thus varying the amount of material delivered to the row per revolution of the rotor, which is directly related to the ground speed of the planter 10. The remaining material dumped from the buckets deflects off the cover and returns to the bottom side of the housing 51. Because the rate of dumping from the buckets 65 per degree of rotation of the rotor is uniform, the adjustment achieved by moving the collector cover 105 will be substantially linear.

OPERATION OF THE PREFERRED EMBODIMENT

In operation, as the planter 10 is operated in the field, the planter drive shaft 36 will be rotated from the ground wheel 14 and the planter fan will be running by virtue of its driven connection with the pulling tractor. Due to its driven interconnection with the planter drive through the gear box 32, the rotor shaft 54 will rotate metering rotor 64 at a relatively low speed synchronized with the ground, preferably about 18 rpm at normal planting speeds. Similarly, the plenum chamber 80 is maintained at a positive pressure, preferably about 3 oz/sq.in. (1.3kPa), by virtue of its connection with the housing 17 of the planter fan through the tubing 87 and pressure reduction means incorporated therein. Fluent materials in the hopper 47 are fed into the bottom of the distributor housing 51 through the filling tube 67 which maintains the material level therein. As the rotor 64 rotates in the direction of the arrow on FIG. 5, the buckets 65 are drawn through the material, become filled, and elevate the material toward the upper portion of the housing 51 dumping excess material along the way, first toward the outer side of the bucket periphery, then toward the inner side. When the leading edge 101 and trailing edge 104 of the buckets 65 are disposed along the angle of repose, $\theta$, of the material, the buckets will gravitationally dump the material radially inwardly of the bucket periphery at a substantially uniform rate per degree of rotor rotation until they are exhausted. Somewhat after the buckets begin uniformly dumping, equal portions of material begin to be collected in the discrete axially spaced material collection openings 79a of the collector 75. This collection continues for a substantial arcuate distance of travel of the rotor buckets 65, up to about 45°, until the material deflects off the cover plate 105. The amount of material dumped by each bucket 65 into the collection opening 79a for one rotation is selectively varied by the circumferential position of the cover plate 105.

As the material drops through the collection openings 79a, it is funnelled down the collection passages 79 to the lower end thereof whereat air is introduced through the passages 83 from the plenum chamber 80. Both the air and the material in each passage 79 then enter the corresponding tube discharge 70 of the manifold assembly 69 and the material is propelled by the difference in pressure between the collection end and the distal ends through the discharge extension tubes 90 to the rows whereat the air pressure may be relieved, if desired, in the diffusers 91 and the material drops into the band distributors 92 which lay the material in a band along the row. Should the tool bar 11 be raised from the ground, as when completing a pass across the field, the drive to the planter 10 and the dispensers 40 and 41 is automatically terminated by the clutch assembly 26, thus terminating further dispensing.

Thus it is apparent that there has been provided, in accordance with the invention, a collector for a pneumatic dispenser that fully satisfies and objects, aims, and advantages set forth above. While the invention has been described in conjunction with a specific embodiment thereof, it is evident that many alternatives, modifications, and variations will be apparent to those skilled in the art in light of the foregoing description. For example, air passages 83 might introduce the air directly into the openings of the discharge tubes 70 rather than into the passages 79 prior to the tubes 70 as shown. Accordingly, it is intended to embrace all such alternatives, modifications, and variations as fall within the spirit and broad scope of the appended claims.

What is claimed is:

1. In a pneumatic material dispenser having a housing, a rotary member disposed within the housing for carrying material on its periphery, a collector within the periphery of said rotary member having a plurality of axially spaced discrete material collection passages having first openings near the periphery of the rotary element for gravitationally receiving material dropped from said rotary member, a plurality of discharge tubes in exclusive fluid communication respectively with each of the collection passages and having distal ends, and air supply means for delivery of air into the collection passage ends of said discharge tubes at a higher pressure than said distal ends to propel the material therethrough, the improvement wherein said collection passages have second openings downstream from said first material collection openings, said second openings opening transversely of said collector, said air supply means comprises a plenum chamber disposed within said housing adjacent said collector for receiving air from a source of pressurized air, and air passage means establishing communication between said plenum chamber and said collection passages at said second openings.

2. The invention in accordance with claim 1 and an opening from said plenum chamber to said housing to maintain the housing at a positive pressure slightly lower than said plenum chamber.

3. The invention in accordance with claim 1 and said air passage means comprising a plurality of air passages, each of said passages exclusively communicating with one material collection passage and being downwardly directed thereinto toward said discharge tubes.

4. In a pneumatic granular material dispenser having a material carrying housing, a rotor disposed within the housing having circumferential axially elongated buckets for picking up said material and dumping said material in the upper portion of the housing, a collector disposed within the bucket periphery for gravitationally receiving material dumped from the buckets over a rotational interval, said collector having a rotationally forward wall and a rotationally rearward wall and a plurality of axially spaced walls dividing said collector into a plurality of axially spaced discrete collection passages having first material collection openings near the bucket periphery, a plurality of discharge tubes in exclusive fluid communication respectively with each of said collection passages, and air supply means for propelling said material through said discharge tubes externally of the housing, the improvement wherein each of said collection passages has a second opening through said rotationally forward wall downstream from said material collection opening, said air supply means comprises a plenum chamber disposed within said housing for receiving pressurized air from a source, and a plurality of air passages from the plenum chamber to the collection passages, each air passage communicating exclusively with one collection passage at said second opening and being directed toward the discharge tubes.

5. The invention in accordance with claim 4 and one of said rotationally forward and rearward walls extending inwardly of the opening of said discharge tubes, said plenum chamber being disposed adjacent said one wall.

6. The invention in accordance with claim 5 and said axially spaced walls being extended into said plenum chamber to form the axial walls of said air passages.

7. The invention in accordance with claim 5 and said one wall being the rotationally forward wall, the surface of said one wall external of the collection passages being a wall of said air passage.

8. The invention in accordance with claim 7 and a wall of said air passage comprising a convex surface reducing the cross-sectional area of said passage from the plenum chamber toward said material collection passages.

9. The invention in accordance with claim 4 and the cross-sectional area of said air passages being reduced in size from the plenum chamber to said material collection passages to reduce the pressure at the material collection ends of said air passages.

10. The invention in accordance with claim 9 and the pressure at said material collection passage ends of said air passages being equal to or slightly lower than the pressure in said housing.

11. In a pneumatic material dispenser having a housing, a rotary member disposed within the housing for carrying material on its periphery, a collector within the periphery of said rotary member having a plurality of axially spaced discrete collection passages having material collection openings near the periphery of the rotary element for gravitationally receiving material dropped from the rotary member, a plurality of discharge tubes in exclusive fluid communcation with each of the collection passages and having distal ends, and air supply means for delivery of air to the collection passage ends of said discharge tubes at a higher pressure than said distal ends to propel the material therethrough, the improvement wherein said air supply means comprises a plenum chamber disposed within said housing parallelly adjacent the collector for receiving air from a source of pressurized air and air passage means establishing communication between said plenum chamber and said collection passages at locations downstream from said material collection openings thereof.

12. The invention in accordance with claim 11 and said collector and said plenum chamber having a common wall.

* * * * *